(12) United States Patent
Potts

(10) Patent No.: US 6,814,866 B1
(45) Date of Patent: Nov. 9, 2004

(54) HEATING A LEACH FIELD

(76) Inventor: David A. Potts, 385 Roast Meat Hill Rd., Killingworth, CT (US) 06419

(*) Notice: Subject to any disclaimer, the term of this patent is extended or adjusted under 35 U.S.C. 154(b) by 116 days.

(21) Appl. No.: 10/053,284

(22) Filed: Jan. 17, 2002

Related U.S. Application Data

(60) Provisional application No. 60/262,310, filed on Jan. 17, 2001.

(51) Int. Cl.[7] .............................. C02F 3/02; B09C 1/10
(52) U.S. Cl. ...................... 210/612; 210/620; 210/170; 210/175; 210/198.1; 210/747; 405/128.15
(58) Field of Search ................................ 210/612, 620, 210/170, 175, 180, 198.1, 220, 416.1, 747; 405/128.15, 128.65, 128.8, 128.35, 128.4, 128.55

(56) References Cited

U.S. PATENT DOCUMENTS

| | | | |
|---|---|---|---|
| 4,812,237 A | | 3/1989 | Cawley et al. .............. 210/605 |
| 4,962,034 A | * | 10/1990 | Khan ......................... 435/262 |
| 5,017,289 A | * | 5/1991 | Ely et al. .................... 210/610 |
| 5,171,434 A | | 12/1992 | Anderson, Jr. et al. ..... 210/121 |
| 5,221,159 A | * | 6/1993 | Billings et al. ......... 405/128.35 |
| 5,279,740 A | * | 1/1994 | Basile et al. ................. 210/610 |
| 5,441,632 A | | 8/1995 | Charon ....................... 210/170 |
| 5,480,549 A | * | 1/1996 | Looney et al. .............. 210/610 |
| 5,542,208 A | * | 8/1996 | Benson ..................... 47/1.01 R |
| 5,577,558 A | * | 11/1996 | Abdul et al. ................ 166/246 |
| 5,681,130 A | * | 10/1997 | Aines et al. ................ 405/130 |
| 5,830,752 A | * | 11/1998 | Bruso ...................... 435/283.1 |
| 6,485,647 B1 | * | 11/2002 | Potts .......................... 210/616 |

* cited by examiner

Primary Examiner—Fred G. Prince
(74) Attorney, Agent, or Firm—C. Nessler

(57) ABSTRACT

The leach field of a septic type sewage system is heated by various means, to raise the temperature and increase biochemical activity in the influence zone of leach field conduits. The capacity for waste water treatment is thus increased or restored. Heating is achieved by alternative means, including by flowing hot air through the leach field conduit and into the influence zone, and by delivering heat directly to the influence zone by means of heat elements embedded in or near the influence zone. The temperature in the influence zone is raised by 1–5° F. or more, preferably to the range 50–100° F. A dedicated, non-dedicated or geothermal heat source may be used. Heat loss upwardly through the soil is inhibited by insulation on the soil surface.

31 Claims, 8 Drawing Sheets

HEATING A LEACH FIELD

This application claims benefit of provisional patent application Ser. No. 60/262,310, filed Jan. 17, 2001.

TECHNICAL FIELD

The present invention relates to subsurface waste water disposal, in particular to the treatment of waste water in a leach field.

BACKGROUND

In a waste water treatment system of the type commonly used for domestic dwellings and other limited volume waste water sources, waste water is flowed first into a tank, where it is acted upon by microorganisms in an anaerobic environment. The temperature in the septic tank, and of the effluent from the tank, is a combination of the temperature of the input waste water, the septic tank environment, and any heat generated by biochemical activity in the tank. The input waste water temperature is of course a function of the source water temperature and any heat added during passage through the dwelling or other waste water generator. There is typically a net heat added to the source water because, among other things, hot water used washing persons and things is dumped into the sewer. A typical septic tank is designed so that the average residence time of waste water is 1–3 days. The heat of the typical anaerobic reaction in the septic tank is considered minor in the view of the volume of in-flowing waste water. And, there is tendency for waste water to equilibrate with the temperature of the surrounding soil or other septic tank environment. Nonetheless, it can be expected and is found that the average temperature of the effluent from a septic tank will be somewhat higher than the average surrounding soil temperature. For information about typical temperature variation in wastewater, see Part 3-2 of the book by Metcalf & Eddy, Inc., "Waste Water Engineering" $3^{rd}$ Ed. McGraw Hill (1991).

Waste water effluent from the septic tank is typically flowed into a secondary waste water treatment system where it can be acted upon biochemically in an aerobic environment, to thereby be made relatively benign and purified, and to then be delivered back into the water table of the earth or another reservoir, and to thereafter be re-used. Most commonly, waste water will be flowed into a leach field. A leach field is comprised of a one or more lengths of conduits which are buried beneath the surface of the earth, and water flows from the conduits laterally and vertically into the surrounding soil. A traditional type of leach field is comprised of perforated pipe running along within trenches filled with crushed stone or gravel overlaid by soil. Less common and less preferred is a covered leach pit, sometimes called a dry well. Concrete chambers with perforated walls, called galleries, are used. In recent years, it has been popular to construct leach fields comprised of lengths of interconnected arch shaped plastic chambers. Generally, the foregoing, and any other structure or device which is buried in the soil which has the purpose to hold or convey waste water, including those which receive waste water which has not first passed through a septic tank, so it can infiltrate into the soil, is referred to here as a conduit.

The soil adjacent to a leach field conduit comprises a region called the influence zone. Waste water from the conduits is biochemically acted upon as it flows through the influence zone to other regions within the soil. The temperature within the influence zone during waste water treatment is a function of various factors, including the ambient temperature of the soil, the atmospheric conditions above the soil surface, the input temperature of the wastewater, and the any heat generated or added in the influence zone. As just discussed, the effluent waste water from a septic tank will tend to be close to, but warmer than, the soil temperature. Heat loss during flow to and through the leaching system conduits will tend to equilibrate the waste water with the soil. Any heat of aerobic reaction in the influence zone, which is not known to be significant, will tend to raise temperature. The typical net result is that on average the temperature in the influence zone can be expected to be above the temperature in like soil remote from the leaching system, principally attributable to the heat content of the waste water from the septic tank source.

The temperature in soil in general and in the influence zone in particular can be affected by local climatic conditions or seasonal changes of the atmosphere. Deep beneath the level of any ordinary leach field, there is rock or subsoil which is reflective of the average annual temperature. The soil near the surface containing a typical leach field is substantially warmed in the summer and cooled in the winter relative to the subsoil temperature; and, the influence zone of a leach field will be accordingly affected. When the influence zone soil is cool, biochemical activity, and thus treatment of waste water, can be adversely affected. When proper biochemical treatment does not take place, organic substances which are pollutants from the wastewater can accumulate in the soil of the leach field. That accumulation will tend to adversely affect the performance of the leach field in the short or long run. A leach field system may fail at certain times of the year, or after a period of use, even years. As a corollary, a leach field may have to be initially made larger than would at first appear to be necessary, because there will be adverse low temperatures in the soil at certain times.

Thus, there is a need for technology which can stabilize and improve the operation of existing fields, and which can counter adverse environmental temperature conditions.

SUMMARY

An object of the invention is to increase the rapidity and extent of treatment within a leach field of a waste water system. A further object is to increase biochemical activity within the influence zone of a leach field system, and to thereby either restore or enhance the capacity of a leach field.

In accord with the invention, the soil within the influence zone of a waste water system comprised of leach field conduits is heated, to significantly affect the biochemical activity which is expected to make the waste water environmentally benign. Different means are employed for adding heat in different embodiments of the invention. In one embodiment, heated air is flowed into the conduits and then into the soil which comprises the influence zone. In another embodiment, heating elements, such as resistance heaters or tubes carrying heated fluid, are placed in or in vicinity of the influence zone soil. For example, heating elements are placed adjacent to, and or beneath, and or within the conduits. In another embodiment, heated gas is delivered directly into the influence zone, as by perforated pressurized pipes.

The effectiveness of the heat addition to the influence zone is enhanced by the use of insulation directly above the conduits or on the surface of the soil, to inhibit loss of heat from vicinity of the conduit through the soil surface.

In a preferred practice of the invention, the temperature of at least a portion of the influence zone is raised by at least 1–2° F., preferably more substantially by about 5° F. or more, compared to what the temperature would be in absence of use of the invention, to enhance biochemical activity and waste water treatment. A 1–2° F. change is significant to biochemical activity. Preferably, the temperature in the influence zone will be raised or maintained in the range of about 50–100° F.; more preferably in the range 50–75° F., with a maximum of about 120° F. In another practice of the invention, air which is warmed by an existing source, such as the atmosphere or a heated space in a dwelling, is flowed to the leach field, to heat the field, whenever the soil temperature is less than the source temperature.

The heat source for heating elements or air or other fluid flowed into the leach field may be any of familiar sources, such as fuel combustion, electric resistance heating, and the like. Air flowed into the leach field by a blower type air mover may be heated by purposeful inefficiency of the blower. Heat for the leach field may be extracted from a geothermal source, for example, the natural water table in the earth. The extracted heat is delivered to the influence zone by means of a circulating heat exchange liquid or the working substance (refrigerant) or a heat pump system. In another aspect of the invention, air is flowed from a source with a temperature which has a certain found heat content, such as atmospheric air or air from a heated basement, according to whether the source air temperature exceeds the soil temperature.

Heating may be continuous or intermittent. When the invention is used, the capacity of an existing system will be enhanced; and systems that are failed can be restored. As a corollary, the leach field size of a new system might be smaller than normal waste water engineering would dictate, so problem sites can be better used.

The foregoing and other objects, features and advantages of the present invention will become more apparent from the following description of preferred embodiments and accompanying drawings.

DESCRIPTION

This application in part is related to my U.S. Pat. No. 6,485,647 Method and Apparatus for Treating Leach Fields, filed Mar. 16, 2000. As is described below, one embodiment of the present invention comprises using the teaching of the related patent application, where air or other reactive gas is flowed through the influence zone, to beneficially affect the biochemical activity which makes the waste water more environmentally benign. In the related application, various ways of causing air to flow through the influence zone are described; among them is flowing atmospheric air into the leach field conduits, and then into the influence zone. The related invention is referred here to as Leaching Field Aeration, or LFA. The description and drawings of the related LFA patent No. 6,485,647 is hereby incorporated by reference.

Figure 1:
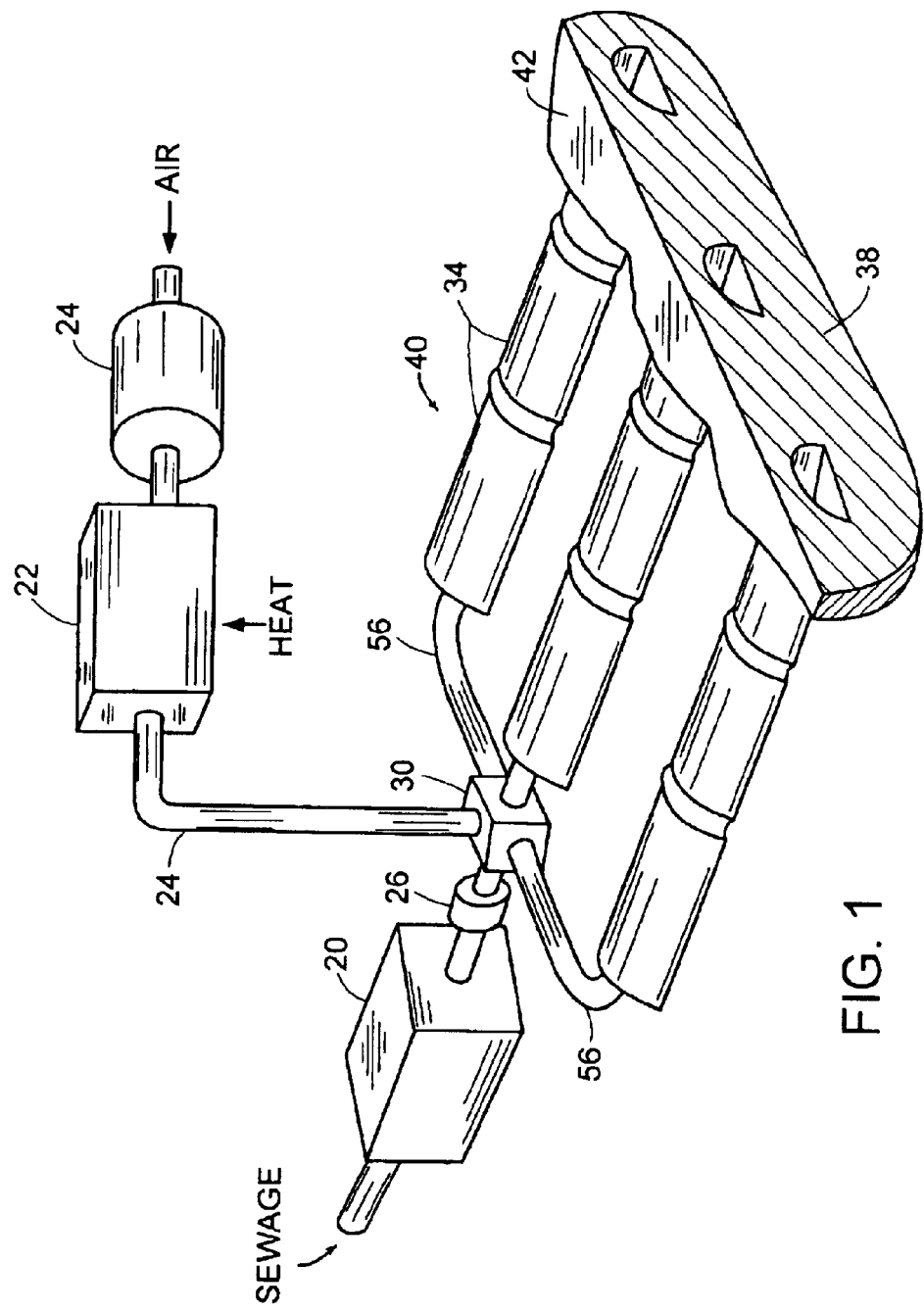
FIG. 1 is a perspective view of a waste water system comprised of a septic tank and leach field, with an associated apparatus for introducing heated air into the leach field.

In one embodiment of the present invention, air is heated and flowed through the influence zone so the zone is thereby heated and the biochemical activity is raised. For example, as schematically illustrated by FIG. 1, a leach field 40 is comprised of Infiltrator® arch shape molded chambers (Infiltrator Systems, Inc., Old Saybrook, Conn., US) 34, or competitive chambers. Waste water flows to and through a septic tank 20, then through a check valve 26, and into the leach field 40. Air pressurized by a blower 24 or other means is heated in a heater 22 or by other means. It is then flowed through hot air input pipe line 24 into a distribution box 30; then through distribution lines 56; and, then through the strings of interconnected chambers 34 which comprise the laterals or branches of the system. The air then diffuses through the soil 38, to exit the soil surface 42 and return to the atmosphere from which it was drawn. The air thereby raises the temperature of the soil in the influence zone compared to what it otherwise would be. When in the practice of the claimed invention, it is said or claimed that heated air or other fluid is flowed into a conduit, from the foregoing it will be understood that the air or fluid can be introduced at a point removed from the conduit, and flowed to the conduit by connecting apparatus.

Figure 2:
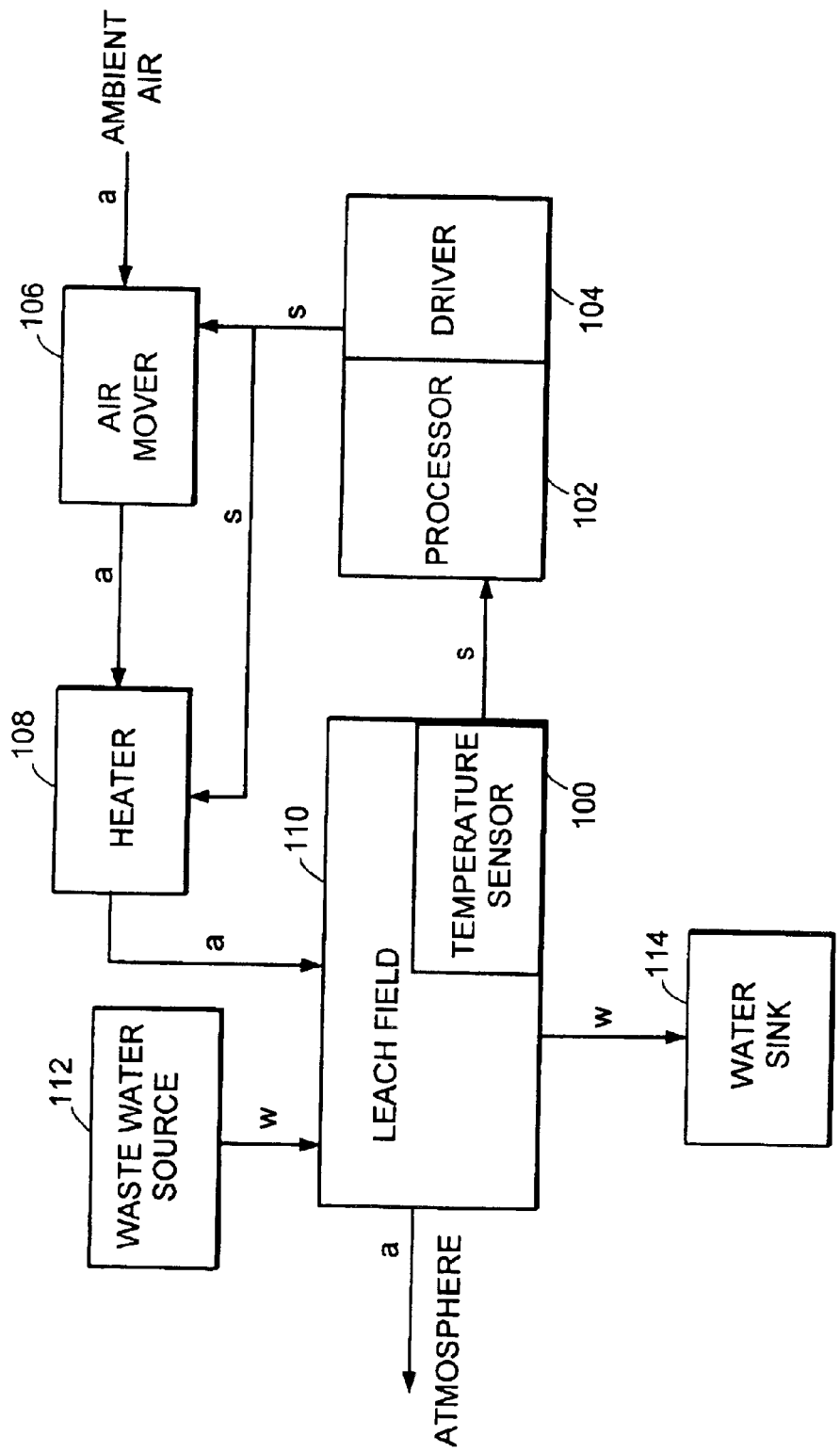
FIG. 2 is a flow diagram showing how flowing heated air into a leach field is controlled.

In the embodiment shown in FIG. 1 and the embodiments which follow, the amount and time of heat input are controlled as manipulated variables, according to measurement of the temperature variable in the influence zone. The FIG. 2 schematic illustration of the system shows how this is effected. One or more thermistor, thermocouple of other temperature sensor 100 is buried in the influence zone, or in some nearby region of the leach field 110 which has like temperature behavior. In FIG. 2, there are lower case letters associated with the arrows which indicate flow: (a) indicates air flow; (w) indicates water flow; and, (s) indicates a signal. Waste water flows from a source 113 to the leach field 110; after treatment it flows to a water sink 114. Air is drawn from atmosphere and discharged back to atmosphere. A signal from the sensor 100 is sent to a processor 102 which compares the signal to a selected internal reference temperature or set point and, through driver 104, drive signals are sent to control the action of the air mover 106 and the heater 108. The drive signals thereby command the temperature, time and or volume of the hot air flow, so that the influence zone in the leach field is heated to a desired temperature for a desired time. Other modes of heat input to the leach field, described below for other embodiments, will be analogously controlled.

Heating of air or other gas which is introduced into the leach field can be accomplished in a variety of ways. In one example, air is passed through a common fuel-fired tube or plate type heat exchanger or a resistance heater. In another example, products of combustion are added to air which is forced into the leach field, in a manner analogous to that used for providing heated air for structures which are under construction, even though it less preferred to introduce gas which provides less oxygen content than that of ambient air. In still another example, the blower is purposefully made inefficient by design or application. For instance, it is intentionally oversized for the task with respect to pressure or flow characteristic; and, the flow is partially choked off. Thus, resultant frictional losses heat the air in the blower. In a further example, there is no dedicated heater, but the air sent to the leach field is drawn from a "found source". By this is meant that the air if heated by a means which is not dedicated to the apparatus for providing heated air to the leach field. For example, air is heated by a heat generating system associated with a building, such as from the furnace-heated confines of a basement, or by the condenser of a refrigeration system. For another example, air of the atmosphere which is naturally warm enough to achieve the desired effect is flowed to the leach field.

Figure 3A:
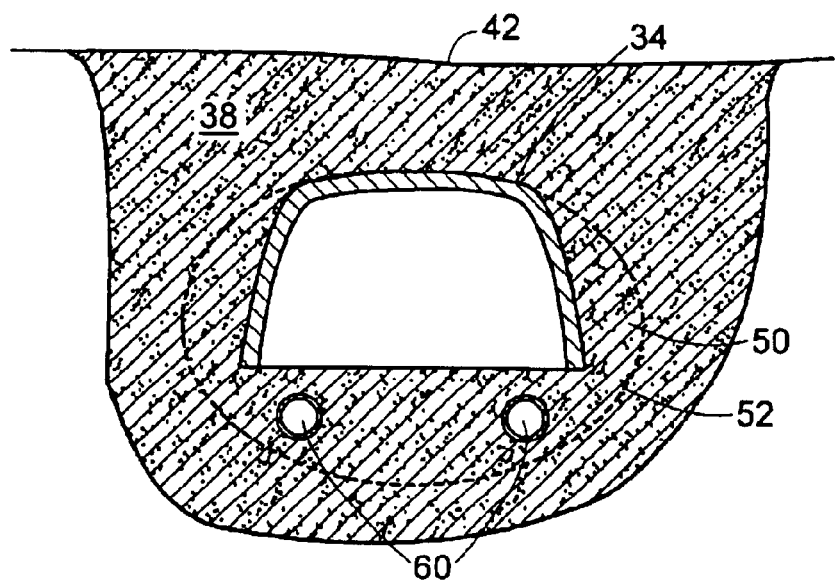
FIG. 3A is a vertical plane cross section view of a leaching chamber buried in the soil, with two heating elements in the influence zone beneath the chamber.
Figure 3B:
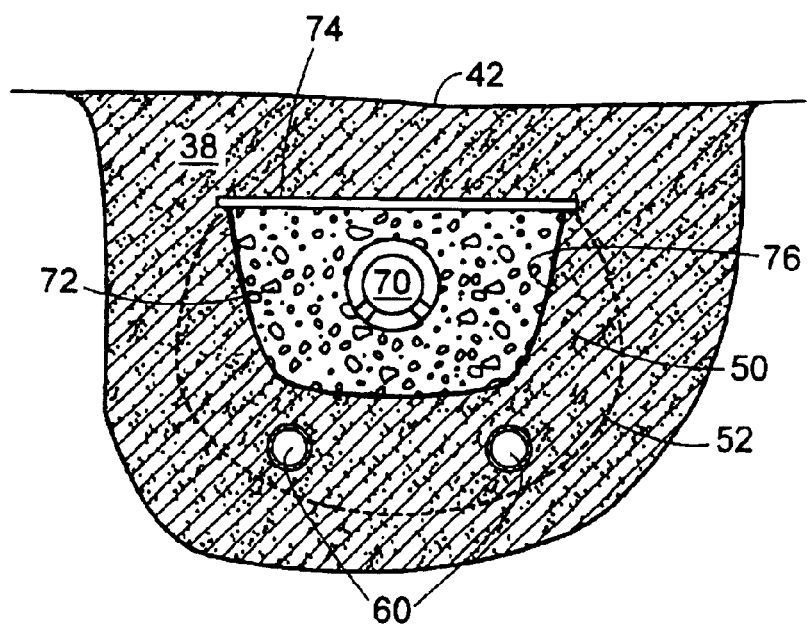
FIG. 3B is a vertical plane cross section view of a perforated pipe and stone trench within the soil, with two heating elements in the influence zone beneath the trench.

FIG. 3A is an vertical plane lateral cross section of a portion of a leach field, showing a chamber 34 buried within the soil 38. The chamber has an influence zone 50 with an indefinite or imaginary boundary 52. The extent of the influence zone will vary with the amount of waste water, its composition, and the natural and imposed parameters which affect the degree and rate of waste water treatment. Heating elements 60 are placed within or very close to the influence zone. In FIG. 3A the elements are beneath the chamber conduit. The elements are heated. Preferably they comprise polyethylene plastic tubing heated by means of circulation of hot fluid, such as water or a conventional heat exchange liquid coming from a heater. Alternatively, elements 60 may be resistance heating elements, although the high cost of electricity in most areas will mitigate against such use except on an infrequent basis. FIG. 3B shows in vertical plane cross section a perforated pipe 70 running within a trench 76 filled within pea stone or gravel 72. A membrane such as filter fabric 74 inhibits soil 38 from migrating into the stone. Two heating elements 60 are beneath the trench in the influence zone. Conceptually, the chamber and stone filled trench of FIG. 3A and FIG. 3B respectively are here both considered as conduits. That is they comprise spaces within the soil for the flow of waste water within the leach field which deliver the water for percolation through the influence zone. (Typically, the spaces between the pea stone or gravel media which fills the trench and surrounds the perforated pipe in the type of system shown in FIG. 3B the media in the trench are a means of holding and delivering waste water to the influence of the soil, even though in some instances some treatment may take place in such media Analogously, a cesspool is also a conduit.) Other devices comprise conduits, as mentioned further below.

Figure 4A:
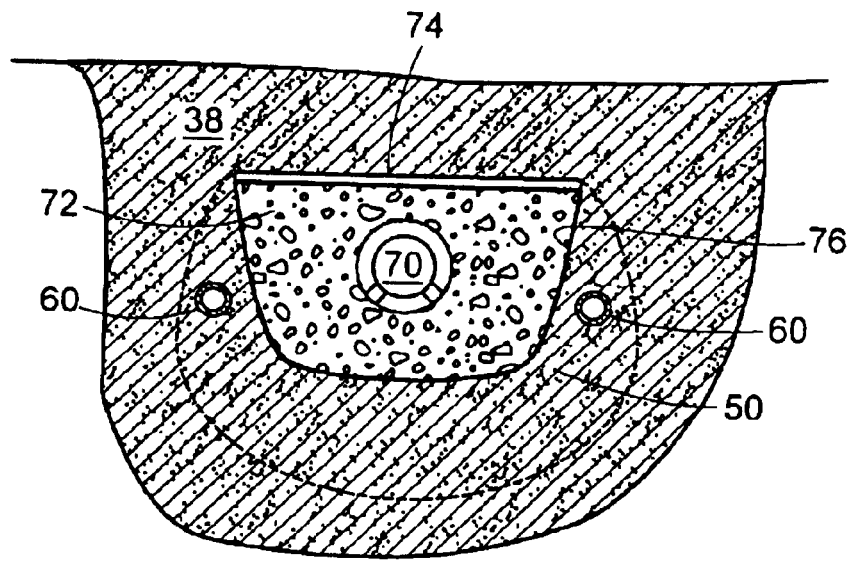
FIG. 4A is like FIG. 3B, showing opposing side heating elements within the influence zone.
Figure 4B:
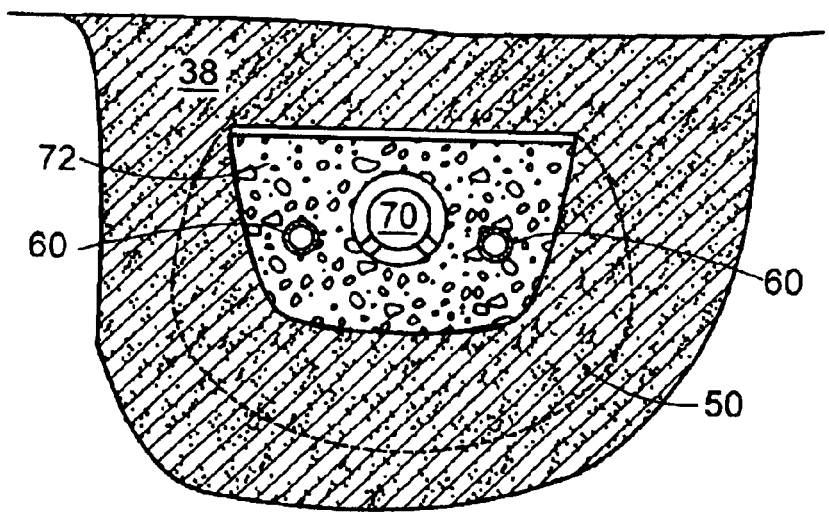
FIG. 4B is like FIG. 3B, showing opposing side heating elements within the conduit trench.

FIG. 4A is like FIG. 3A, but shows another embodiment in which the heating elements 60 are placed within the influence zone, laterally adjacent the trench 76 which defines the outer bound of the conduit. FIG. 4B is a similar figure, showing heating elements within the conduit, i.e., within the stone of the trench. In another embodiment, flow of heated or unheated air through the perforated pipe and gravel, and into the influence zone, may be used in combination with heating elements. In another alternative, the heating elements 60 are perforated tubes and carry hot air under pressure, to discharge it directly into the soil for heating. In still another embodiment, the elements 60 are perforated hollow tubes and the heated air diffuses directly into the soil of the influence zone. Hot water may be substituted for hot air in the foregoing examples, including flowing such into and through the septic tank. But using hot water in such way is generally not desirable, since typically a problem is that the leach field cannot process the normal waste water load.

Heat may also be added through heat of reaction or solution of chemicals introduced into the influence zone, such as hydrogen peroxide or sodium hydroxide. However, for reasons of cost and side effects, using such means is unattractive. In the practice of the invention, heat may also be delivered to the soil adjacent the influence zone, or to the surface above the leach field, since there will be resultant heat transfer to the influence zone, although doing so can less efficient than other alternatives.

The heat which is delivered to the influence zone can be provided on a continuous or an intermittent basis. For example, heating might be employed on a short term basis to help restore the functioning of a misused or malfunctioning system; or, heating might be used only when seasonal air or background soil temperature is low; or, heating might be used when the BOD load in the waste water is particularly high; or, heating might be provided at different times of a day in coordination with changing volume of character of waste water.

In the generality of restoring failed or failing systems, heating of the influence zone may be best carried out, if possible, without the concurrent flow of waste water. Thus, before providing heat to the influence zone by one of the means described herein, water in a septic tank, distribution lines, and conduits may be removed in whole or part by pumping. And, suction may be applied to the conduits, or alternatively pressure may be applied, to draw or push water from the influence zone, as described in patent application Ser. No. 10/053,311 filed Jan. 17, 2002.

When the conduit or influence zone is heated, obviously the surrounding soil will tend to be heated by heat transfer. There can thus be substantial heat loss upward through the overlying soil surface. Thus, in another aspect of the invention, a layer 80 of insulation material is applied to the surface 42 of the soil which lies proximity above the conduit and influence zone, as shown in FIG. 3. The insulation layer may be so simple as to comprise a plastic membrane laid on the soil surface, to inhibit convection and or evaporation and or radiation to or from the soil surface to the atmosphere; or it may be a fibrous mat or closed cell board. Some field observations indicate that the heat loss may be reduced by up to a factor of five by a simple membrane laid on grass. This effect is attributed to the dead air space created within the grass which is overlaid by the sheet. In another alternative, an insulation mat is placed within the soil, proximate the top of the chamber 34 and its associated influence zone 50. Thus upward heat loss in the area of highest heat flux is retarded. Examples of mats which may be used comprise: insulation such as closed cell polyurethane foam, or hay or dry sand covered by a membrane to prevent infiltration of rain water, may be used. An insulating layer is also useful to inhibit loss of the heat added by the waste water or due to the natural heat of the earth.

In the invention, the temperature of the influence zone is raised. Generally, for every 10° F. increase in temperature the rate of biochemical activity is doubled. On the other hand, if the temperature becomes too high, the microorganisms which beneficially act on waste water will cease to act and can be destroyed. Thus, from this standpoint, the temperature should not exceed 120° F. and preferably is in the range of about 77–98° F. See R. Mitchell "Introduction to Environmental Microbiology", Prentice Hall, New York (1974). The foregoing elevated temperatures compare to typical average soil temperatures of 50–70° F. in the continental United States.

Figure 7:
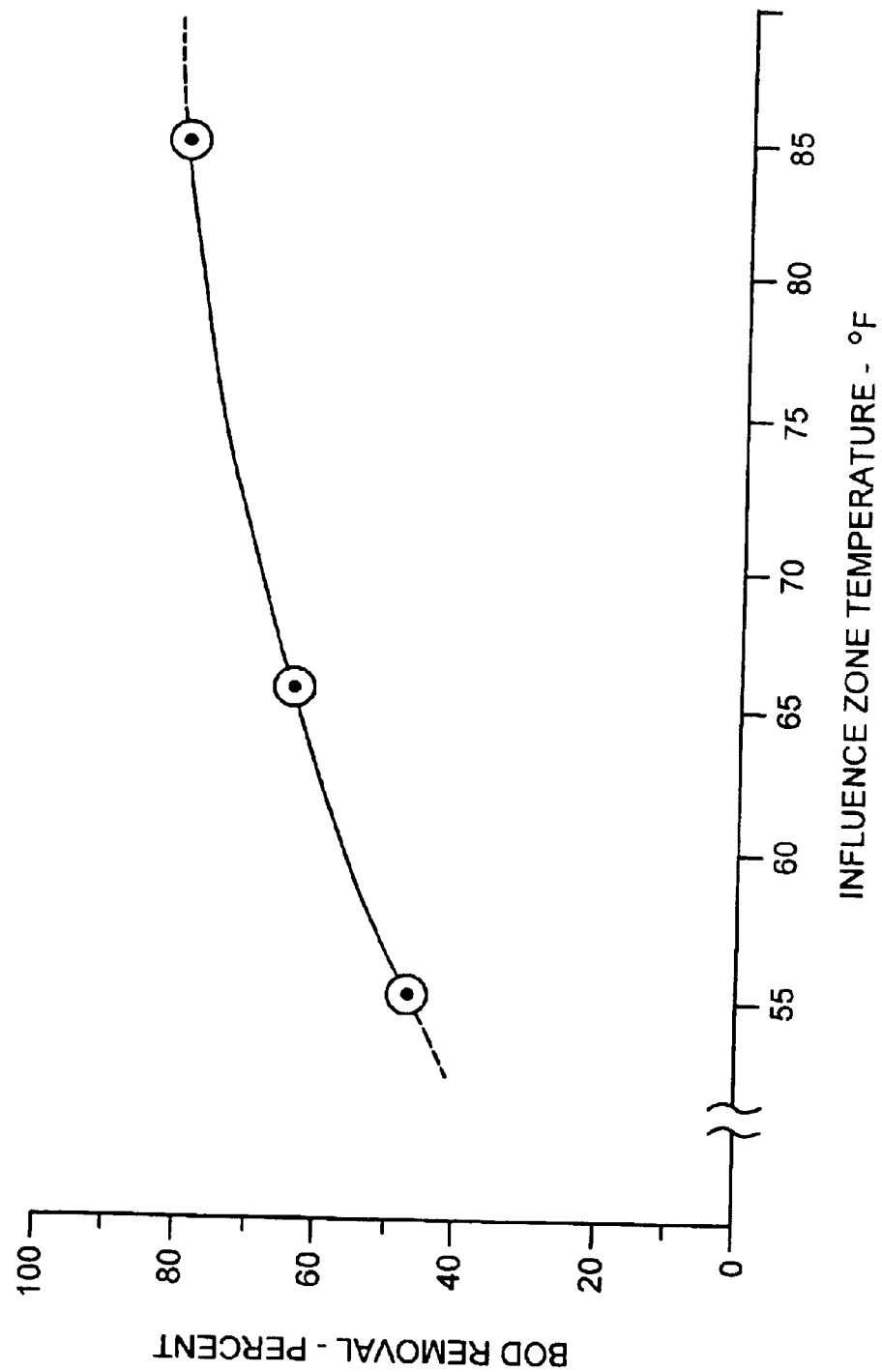
FIG. 7 is a graph showing the effect of influence zone temperature on BOD removal.

FIG. 7 shows how biological oxygen demand (BOD) was affected by temperature change in an experimental setup simulating a leach field influence zone, where waste water having a BOD of about 300 mg/l was flowed vertically down through a bed of fine sand contained in a vessel with a relatively high rate of through-flow. The bed and thus the waste water passing through were heated to the indicated temperature by heaters around the vessel. The composition of the water which percolated through the bed by gravity was measured. The Figure shows how BOD removal is increased from about 50 to about 80 percent by a 30° F. temperature rise. That curve slope nominally represents a 2% change for each degree Fahrenheit temperature increase.

Thus, in the practice of the invention an influence zone temperature increase of about 5° F. is considered substantial; and, a temperature increase of 1 to 2 degrees F is considered significant; where the increase is with reference to conditions which obtain in the absence of artificially raising the temperature of an influence zone or other leach field component. In the invention, it is preferred that heating be sufficient to raise the temperature to within the range of about 70–100° F. While it would be microbiologically good to have an influence zone temperature in the aforementioned 77–98° F. range, as a practical matter sufficient benefit is obtained by heating to a more preferred 50–75° F. range, since the cost of heating will be lower. Generally, any heating is beneficial. Thus, in one mode of the invention, heated air is flowed into the leach field whenever the soil temperature is less than the source temperature, for instance as might be the case when warm air is drawn from the basement space of a dwelling or the warm atmosphere, as described above.

In the best practice of the invention the temperature of any heating elements and of any fluid flowed into the influence zone is kept below about 120° F. However, it would be tolerable to have a relatively small sub-zone proximate a heating element exceed 120° F., since any resultant microbiologically "dead zone" would be later re-populated. In analogous fashion, if the heating element is located outside the influence zone, in the expectation that heat would flow into the influence zone, then the heating element could be maintained at a higher temperature.

Obviously, it can be costly to do the heating which is described. The vertical plane cross section of FIG. 5 semi-schematically illustrates how the heating cost may be reduced by using geothermal heat which is extracted from the subterranean earth and transferred into the leach field. As the arrows indicate, liquid is circulated through heating system lines 66 by pump 48 to geothermal heat exchanger 62 and then to the heating elements 60 buried under or in proximity to chambers 34 of the leach field. The heat exchanger 62 is placed in the native ground water which rises to a water table level 64 or at another place in the earth or elsewhere from which natural or waste heat can be gathered.

Figure 5:
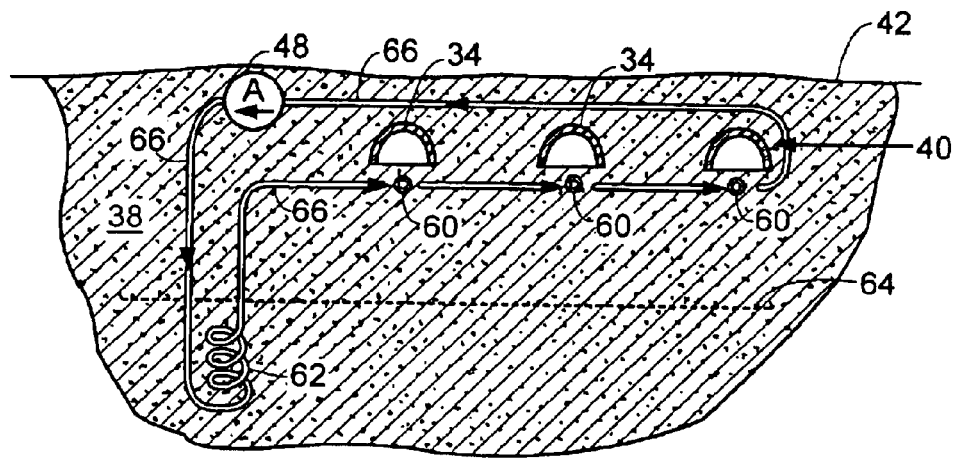
FIG. 5 is a vertical cross section through the soil, schematically illustrating a geothermal heating system for a leach field that uses a heat exchange fluid.
Figure 6:
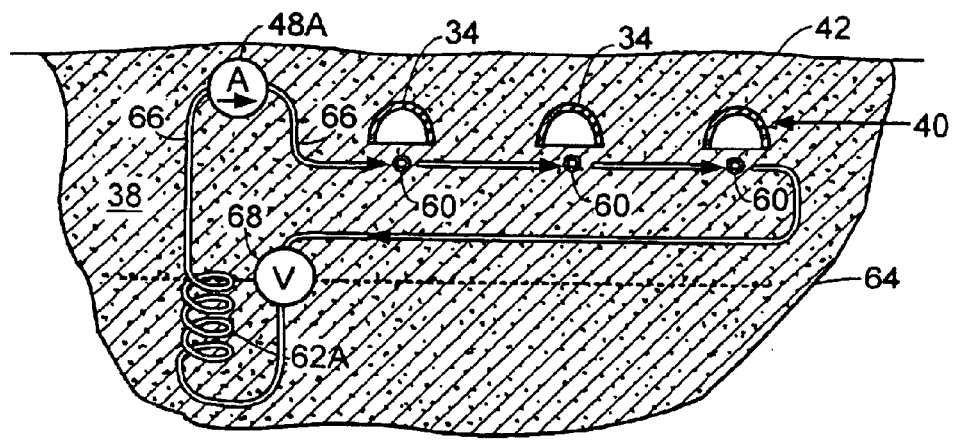
FIG. 6 is like FIG. 5, showing a geothermal heating system comprising a heat pump.

A heat pump can substitute for the simple circulating system of FIG. 5. In such case, a flow of heat exchange substance, such as a Freon™ flurocarbon refrigerant, would be in the opposite direction of that shown in FIG. 4 as compared to FIG. 5. In FIG. 5 the arrows indicate flow of refrigerant. Compressed refrigerant is expanded through valve 68, flowed to the heat exchanger 62A which acts like a cooling coil, to be heated by transfer of heat from the water table. The refrigerant then flows to the compressor 48A, and then to the heating elements 60 where the heat of compression and the heat from the water table will be transferred to the influence zone. The refrigerant then flows back to the expansion valve to repeat the circulation.

In another alternative, solar energy can be employed for heating heat air or fluid which is flowed to leach field. The air or other fluid is heated in a known type of solar panel, where radiant sun energy impinges on a surface which contacts the air or fluid.

The following calculation suggests the magnitude of thermal energy that must be delivered to soil of a leach field, to achieve a certain level of temperature rise. A simple hypothetical leach field comprises about 100 feet of pipe and stone conduit. The trench is two feet wide by one foot deep, in very sandy soil. The heated layer is 4 inch thick, all around the conduit. When 200 cubic feet per minute (cfm) of 120° F. air is flowed to the conduit, the soil layer temperature is raised by about 14° F. When the air flow is about 100 cfm, the change is about 7° F.; and, the steady state heat input is about 13,000 btu/hr. These data assume essentially dry soil and no flow of waste water through the conduit or layer. To the extent there would be flow of waste water in the example, and the temperature of such is colder or hotter than the desired temperature of the layer, more or less heat input would be required.

Field data, acquired on a preliminary or developmental basis, illustrate the behavior of a certain typical domestic septic systems located in southern New England where the average annual temperature is about 55° F. The data show the effect of season and the effect of heating by means of the invention. In one waste water system, a normally operating septic tank leach field comprised of a single run of about 100 feet of traditional pipe and stone conduit had a waste water flow rate of about 300 gallons per day (gpd). In the summer time, the average daily air temperature was 74° F.; source well water was 55° F.; background soil temperature (far away from the system) was 66° F.; septic tank effluent temperature was 73° F. All soil and influence zone temperatures were measured at about 14 inch depth. The primary measure of influence zone temperature along the length of the conduit was made by sensing at the interface of the zone with the conduit. The lateral temperature profile, that is, change in a direction transverse to the conduit length, was measured at the inlet end at points one inch and 12 inch away, and at "infinity", i.e., tens of feet away, which is to say, the background soil temperature. (The bounds of the influence zone were not determined.) The same system was monitored months later during the winter time. A different, but essentially similar and comparative system, was measured during winter time, to show the effect of constantly blowing about 90 cfm of 60° F. hot air through the conduit length from the inlet end.

Figure 8:
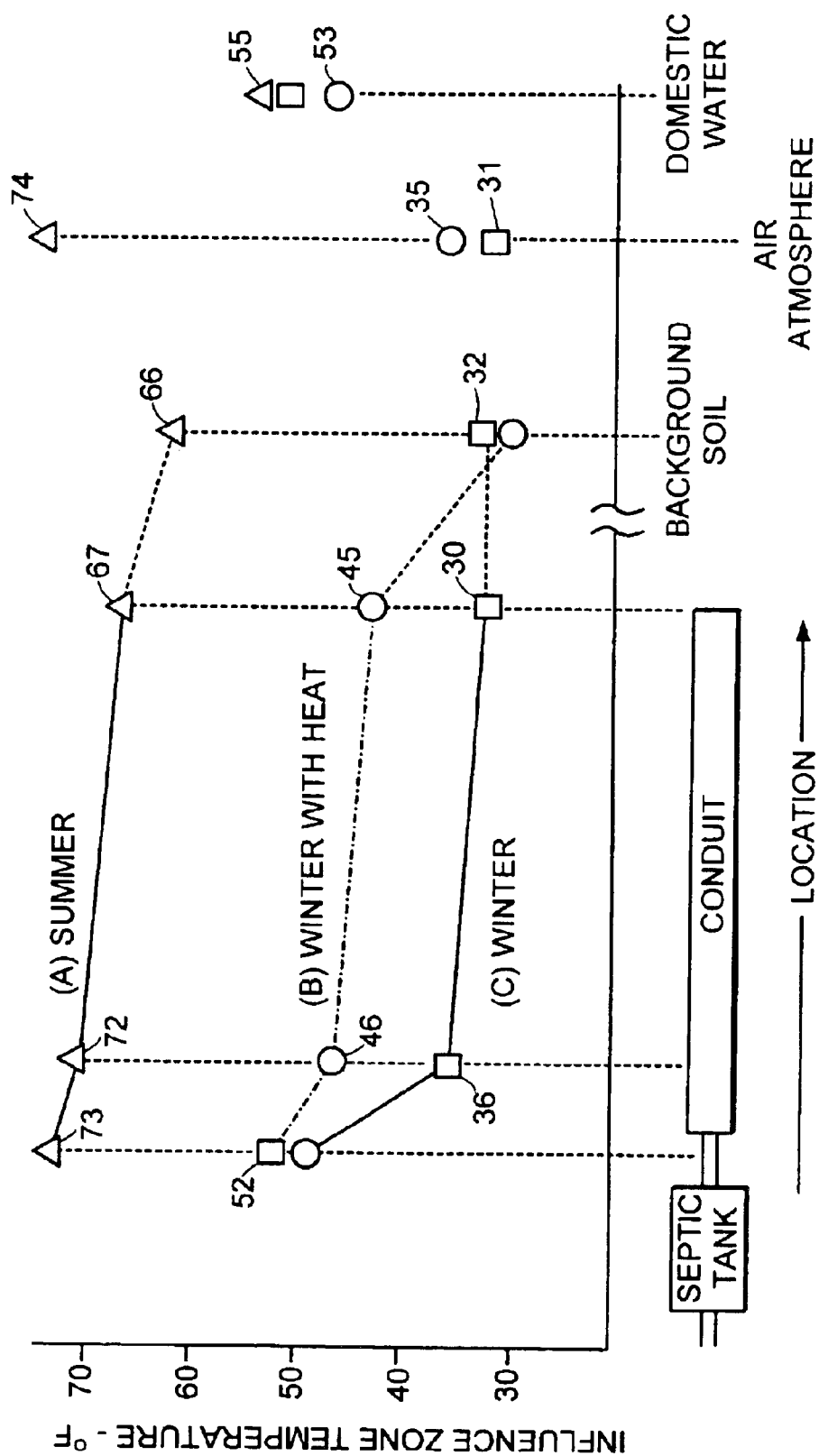
FIG. 8 shows temperature profiles along the length of a waste water system and the effect of seasonal temperature change and forced air heating.
Figure 9:
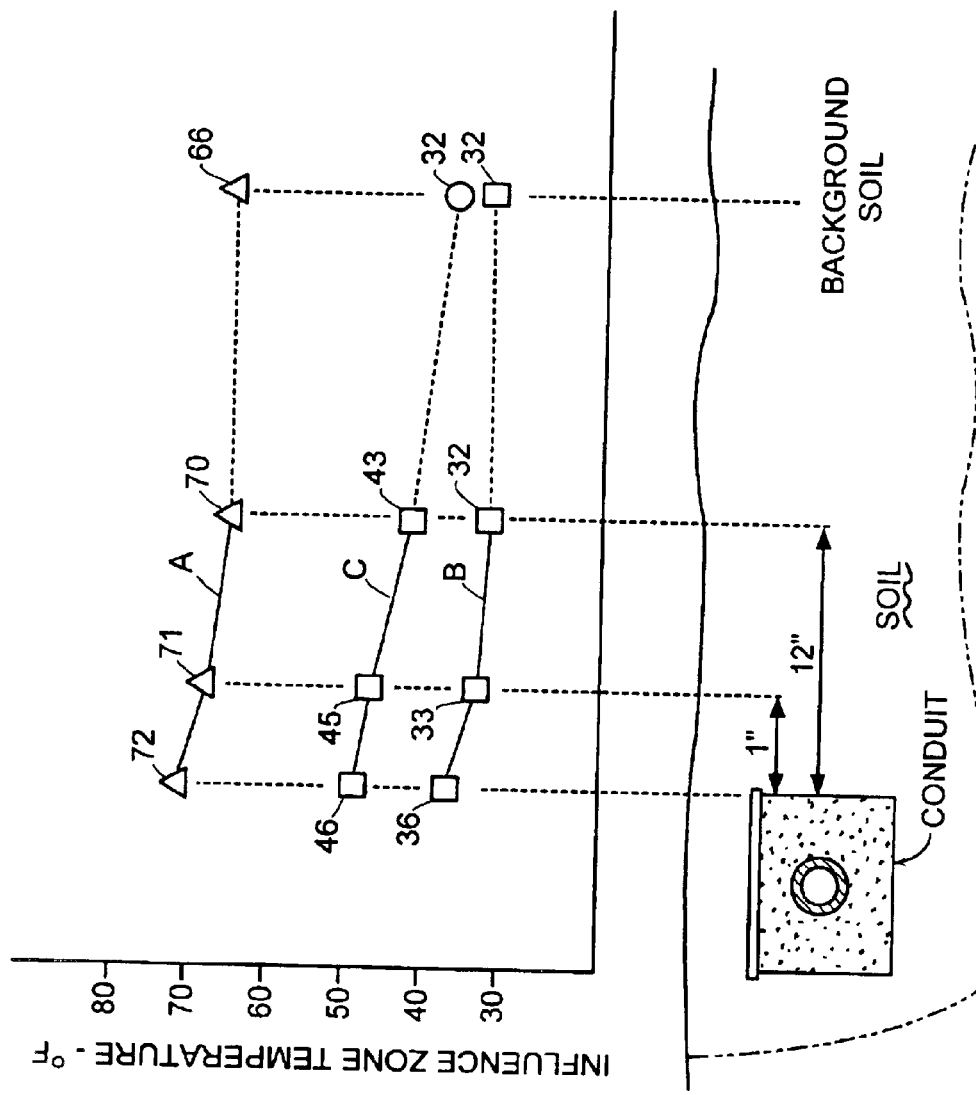
FIG. 9 is like FIG. 8, but shows a lateral profile.

The data are presented in FIGS. 8 and 9. FIG. 8 shows the temperature profile along the length of a waste water system while FIG. 9 shows the lateral profile. Curve A shows a summer time situation. Curve B shows the same system in winter time, and indicates how the colder temperatures suppress temperatures through out the system. Curve C shows the beneficial effect of heating, in raising otherwise suppressed temperatures of the leach field during winter time.

While gas other than air can be used in practice of the invention, the invention is best employed in combination with the LFA invention. Thus, the heated air that warms the influence zone also provides desired oxygen. In another respect, when the LFA invention is practiced using air from a cold atmosphere source, there may be an unintended negative effect of cooling the influence zone. Thus, in another mode of the present invention, the heating of air is sufficient to temper the air temperature by making it less cold, so as to equilibrate its temperature with the soil temperature of the leach field or the influence zone, and mitigate any cooling.

The invention can be used in combination with know types of measurement and control systems. For instance, the temperature in the conduit or influence zone can be measured on an intermittent or continuous basis, and the amount of thermal energy input to the leach field will be a manipulated variable, according to the deviation of the measurement from a reference or set point which represents a condition which the user desires for temperature or some other parameter which is affected by temperature. The control system will control energy input in ways that should be evident, for instance by controlling power or volume of heated liquid to heating elements, or by controlling air flow. For example, the controlling will comprise: sensing the temperature in the influence zone, comparing said temperature to a reference temperature, and controlling the extent of delivering of heat according to the difference between the two temperatures.

The invention has been described in terms of domestic waste water treatment, but it will be applicable to the processing of industrial and other waste water as well. While the best mode of the invention has principally been described in terms of either chambers or gravel filled trenches, it will be understood that it can be applied similarly to other waste water treatment devices used in substitution of the kinds of leach fields which have been described, such as leach pits, and proprietary systems sold in commerce which include corrugated leaching systems covered with filter fabric, so called in-drain leaching units, fins, and living filters. The invention can be applied to the treating of waste water in other waste water treatment systems, for instance, to sand filter beds. The invention can be applied to conduits which commonly are considered to be unitary (versus primary and secondary) treatment systems, for instance, cesspools, where waste water directly flows from a source to a cavity in the soil.

Although this invention has been shown and described with respect to a preferred embodiment, it will be understood by those skilled in this art that various changes in form and detail thereof may be made without departing from the spirit and scope of the claimed invention.

I claim:

1. A method of subsurface waste water treatment within a leach field comprised of at least one conduit buried in soil near the surface of the earth, wherein waste water is continuously or repetitiously flowed into a generally horizontally running conduit and then into an aerobic influence zone in the soil, in which zone the biochemistry of the waste water is altered to become more environmentally benign, which comprises: delivering heat to the influence zone, to significantly heat the soil therewith.

2. The method of claim 1 wherein the heat is delivered to the influence zone by flowing heated fluid through the conduit and then into the influence zone.

3. The method of claim 2 wherein the heated fluid is air.

4. The method of claim 3 wherein the temperature of the air is less than 120° F.

5. The method of claim 3 wherein air is drawn from a source which provides air with a found heat content; further comprising: flowing air into the conduit whenever the temperature in soil in or adjacent to the influence zone is less than the temperature of the found heat content air.

6. The method of claim 1 wherein the temperature of the influence zone is raised by at least 5° F. over the temperature which obtains in the absence of heating.

7. The method of claim 1 wherein the heating is sufficient to maintain the influence zone at a temperature in the range 50–100° F.

8. The method of claim 1 wherein heat is provided to the influence zone by imbedding at least one heating element within the soil which is within or adjacent to the influence zone.

9. The method of claim 1 wherein heat is provided to the influence zone by means of a heating element within the conduit.

10. The method of claim 8 wherein the heating element is in the portion of the influence zone which underlies the conduit.

11. The method of claim 8 wherein in the heating element comprises a tube, further comprising: flowing a heated fluid through the heating element.

12. The method of claim 1 wherein heat is provided to the influence zone by flow of heated fluid from a perforated tube buried within the soil which is within or adjacent to the influence zone.

13. The method of claim 1 which further comprises: sensing the temperature in the influence zone, comparing said temperature to a reference temperature, and controlling the extent of delivering of heat according to the difference between the two temperatures.

14. The method of claim 1 which further comprises: inhibiting vertically upward heat loss by insulating the soil above the conduit.

15. The method of claim 14 wherein a membrane laid on the surface of soil directly above the conduits and influence zone.

16. The method of claim 1 wherein a geothermal source of heat underlies the soil containing the conduit, which further comprises: transferring heat from the geothermal heat source to the influence zone.

17. The method of renovating or restoring the function of a leach field comprised of at least one conduit buried in soil near the surface of the earth, wherein waste water is continuously or repetitiously flowed into a generally horizontally running conduit and then into an aerobic influence zone in the soil, in which zone the biochemistry of the waste water is altered to become more environmentally benign, which comprises: delivering heat to the influence zone, to significantly heat the soil therewith.

18. The method of claim 17 which comprises temporarily ceasing the flow of waste water to the leach field, then heating the influence zone, then flowing air through the influence zone, and then resuming the flow of waste water to the leach field.

19. Leach field apparatus for treating waste water within soil which comprises:

a generally horizontally running conduit, buried near the surface of the soil, for conveying waste water into and within the soil, and for percolating waste water into an associated influence zone in the soil;

an influence zone in soil adjacent the conduit, for receiving the waste water from the conduit and for biochemically altering the waste water to make the waste water more environmentally benign; and, means for heating the influence zone, to raise the temperature thereof and to increase biochemical activity therewithin.

20. The apparatus of claim 19 wherein the means for heating comprises heating elements buried in the soil.

21. The apparatus of claim 20 wherein the heating elements are tubes through which hot fluid circulates; further comprising: means for raising the temperature of hot fluid, to be circulated through the heating elements.

22. The apparatus of claim 19 wherein the heating elements are within the soil of the influence zone.

23. The apparatus of claim 19 wherein said means for heating comprises means for flowing heated air into the influence zone.

24. The apparatus of claim 23 which further comprises: means for flowing heated air through the conduit and then into the influence zone.

25. The apparatus of claim 24 wherein the means for flowing heated air comprises:

an air mover for pressurizing atmospheric air; and, means for heating the atmospheric air.

26. The apparatus of claim 25 wherein the air mover draws atmospheric air from within a building having an associated heat generating system; and, wherein said means for heating the atmospheric air comprises said associated heat generating system.

27. The apparatus of claim 25 wherein the air mover is a blower and the means for heating the atmospheric air is purposeful inefficiency in operation of the blower.

28. The apparatus of claim 19 wherein said means for heating comprises means for transferring heat from a source of heat which is within soil spaced apart from the leach field.

29. The apparatus of claim 28 wherein the source of heat is water within the earth underlying the soil.

30. The apparatus of claim 29 wherein the means for transferring comprises a heat pump.

31. The apparatus of claim 19 further comprising means for inhibiting vertical transfer of heat through soil above the conduit.

* * * * *